Figure 1:
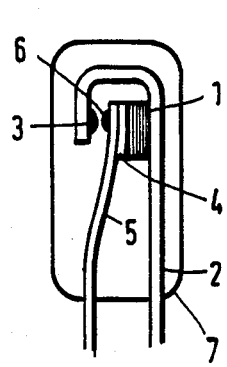

United States Patent [19]

Ziegenbein

[11] Patent Number: 4,652,964
[45] Date of Patent: Mar. 24, 1987

[54] VARISTOR FUSE ELEMENT

[75] Inventor: Botho Ziegenbein, Neckarsteinach, Fed. Rep. of Germany

[73] Assignee: Brown, Boveri & Cie AG, Mannheim, Fed. Rep. of Germany

[21] Appl. No.: 612,303

[22] Filed: May 21, 1984

[30] Foreign Application Priority Data

May 21, 1983 [DE] Fed. Rep. of Germany ....... 3318588

[51] Int. Cl.[4] ...................... H02H 3/20; H01H 83/10; H01H 85/04
[52] U.S. Cl. ........................................ 361/54; 337/15; 361/56
[58] Field of Search ................ 361/54, 103, 104, 106, 361/124; 337/4, 5, 15, 17, 32, 401; 315/75, 122

[56] References Cited

U.S. PATENT DOCUMENTS

| | | | |
|---|---|---|---|
| 3,213,345 | 10/1965 | Loftus | 361/54 |
| 3,345,482 | 10/1967 | Lou | 337/15 |
| 4,096,464 | 6/1978 | Dennis et al. | 361/104 |
| 4,249,224 | 2/1981 | Baumbach | 337/32 |
| 4,288,833 | 9/1981 | Howell | 361/124 |

Primary Examiner—A. D. Pellinen
Assistant Examiner—A. Jonathan Wysocki
Attorney, Agent, or Firm—Herbert L. Lerner; Laurence A. Greenberg

[57] ABSTRACT

Varistor fuse element for protecting an electric circuit against overvoltages, including a thermal fuse, a varistor combined with the thermal fuse for for tripping the thermal fuse with joulean or ohmic heat losses of the varistor, first and second conductors for supplying current to the fuse element, and first and second switch contacts each being connected to a respective one of the conductors for bridging the varistor, the contacts being closed when the thermal fuse is tripped by the varistor.

2 Claims, 3 Drawing Figures

VARISTOR FUSE ELEMENT

SPECIFICATION

The invention relates to a varistor fuse element for protecting an elective circuit against overvoltages.

Such a varistor fuse element is known from the publication by Hoft, entitled: "Passive Elektronische Bauelemente" (Passive electronic components), Huthig-Verlag, Heidelberg/Basle, 1967, pages 89 to 97. In this device, the non-linear voltage-dependent resistance change of varistors is used for protecting an electric circuit against overvoltages. The resistance value of varistors decreases with increasing voltage applied thereto. The effect is not based on heating in conjunction with a negative temperature coefficient, but rather on the fact that the number of free charge carriers in the varistor increases with increasing voltage.

As a protection against overvoltages or for voltages stabilization purposes, it is proposed in the prior art device to connect a varistor in parallel with the circuit to be protected. This results in good reversible voltage stabilization, that is to say after the overvoltage has died off the varistor resistance, which had temporarily become low, resumes high values. However, for some applications, it is desirable to irreversibly short out or permanently bridge the electric circuit to be protected, after the occurrence of an overvoltage.

It is accordingly an object of the invention to provide a varistor fuse element, which overcomes the hereinafore-mentioned disadvantages of the heretofore-known devices of this general type, and which is capable of producing an irreversible low-resistance short-circuit bridge effect in the event of overvoltages and overtemperatures occurring in electric circuits.

With the foregoing and other objects in view there is provided, in accordance with the invention a varistor fuse element for protecting an electric circuit against overvoltages, comprising a thermal fuse, a varistor combined with the thermal fuse for tripping the thermal fuse with joulean or ohmic heat losses of the varistor, first and second conductors for supplying current to the fuse element, and first and second switch contacts each being connected to a respective one of the conductors for bridging the varistor, the contacts being closed when the thermal fuse is tripped by the varistor.

The advantages which can be achieved by means of the invention are found especially in the fact that the varistor fuse element has a very simple construction, and accordingly can be manufactured for a very moderate price. Depending on the thermal fuse material used, the device can still reliably perform even with high temperatures, for example at 400° C.

In accordance with another feature of the invention the first conductor is U-shaped and is directly connected to the varistor, the thermal fuse is an electrically conductive fusible alloy connected between the varistor and the second conductor, the second conductor is resilient, and the contacts are disposed opposite each other.

In accordance with a further feature of the invention, the varistor is directly connected to both of the conductors, the first conductor is U-shaped and has an extended end, the second conductor has a tub-shaped recess formed therein, and the contacts are disposed opposite each other, and including an insulator disposed between the extended end and the recess.

In accordance with an additional feature of the invention, the insulator is in the form of a resilient composite structure of glass fibers.

Although the invention is illustrated and described herein as embodied in a varistor fuse element, it is nevertheless not intended to be limited to the details shown, since various modifications and structural changes may be made therein without departing from the spirit of the invention and within the scope and range of equivalents of the claims.

Figure 2:
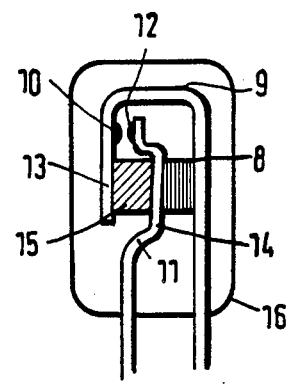
Figure 3:
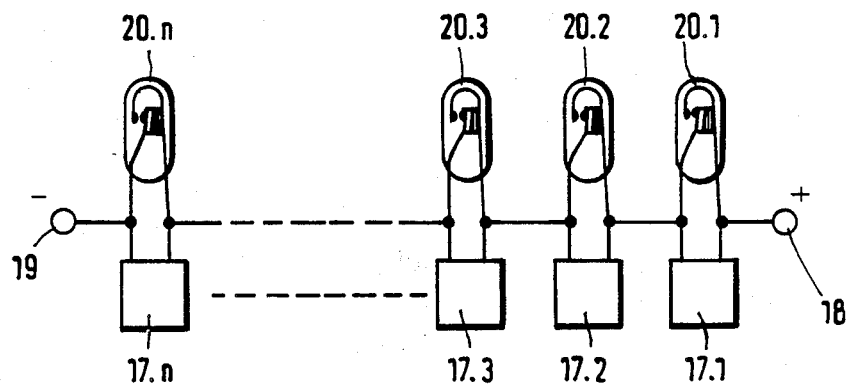

The construction and method of operation of the invention, however, together with additional objects and advantages thereof will be best understood from the following description of specific embodiments when read in connection with the accompanying drawings, in which:

FIGS. 1 and 2 are diagrammatic front-elevational views showing two different embodiments of thermal varistor fuse elements; and FIG. 3 is another front-elevational view showing varistor fuse elements used with a high-temperature battery.

Referring now to the figures of the drawings in detail and first particularly to FIG. 1 thereof, there is seen a first embodiment of a thermal varistor fuse element. A varistor 1 is connected to a first conductor or lead wire 2 serving as an electrical connection. The conductor 2 is constructed in a U-shape and has a first switch contact 3 at the open end thereof. The varistor 1, which is attached to the conductor 2 opposite the switch contact 3, is connected through a fusible alloy 4, serving as solder material, to a second conductor 5 serving as an electrical connection.

An aluminum-silicon-tin alloy or other generally known aluminum solders can be used as the fusible alloys 4. The melting point of such alloys is preferably at 400° C. to 500° C.

The second conductor 5 is constructed as a spring and has a second switch contact 6 disposed at the open end thereof. The varistor fuse element is enclosed by an enclosure 7.

The second switch contact 6 is disposed exactly opposite the first switch contact 3. If the fusible alloy 4 has not been destroyed, the switching contacts 3 and 6 are open and the resilient second conductor 5 is firmly connected to the first conductor 2 through the fusible alloy 4 and the varistor 1.

During normal operation, after the two feed lines 2 and 5 are connected, a current flows from the first conductor 2 through the varistor 1 and the fusible alloy 4 to the second conductor 5, or in the reverse direction. In this context, the term "normal operation" in particular means that the operating voltage present between the two conductors 2 and 5 does not exceed a predeterminable permissible limiting or critical value.

However, when overvoltages occur (the operating voltage between the conductors 2 and 5 exceeds a permissible limiting value), the forward current of the varistor 1 rises steeply, in accordance with the I/U characteristic of the varistor (the characteristic is explained, for example, in the publication Hoft, entitled: "Passive Elektronische Bauelemente" or Passive electronic components, Huthig-Verlag, Heidelberg, 1967, page 89). The corresponding strong increase of the power dissipation or loss in the varistor 1 also heats the varistor. This temperature increase is used for dissolving, that is to say melting, the fusible alloy 4 serving as a secondary, irreversible thermal fuse. As a result, the second conductor 5 constructed as a spring is released from the varistor 1 and the switch contacts 3, 6 are consequently closed.

After the thermal fuse has been tripped, a current flow occurs from the first conductor 2 through the switch contacts 3, 6 to the second conductor 5, or in the reverse direction.

FIG. 2 shows a second embodiment of a thermal varistor fuse element. In this construction, a varistor 8 is again connected to a first conductor 9 which is bent in a U-shape. The conductor 9 has a first switch contact 10. In addition, the open end of a second conductor 11 is again provided with a second switch contact 12.

In contrast to the embodiment according to FIG. 1, the U-shaped first conductor 9 has an open end 13 which is extended past the first switch contact 10. The oppositely-disposed second conductor 11 has a tub-shaped or troughlike recess 14 in the vicinity of this extended end 13 of the first conductor 9. An insulator 15 is inserted or attached between the extended end 13 and the tub-shaped recess 14. The insulator 15 may be formed of an elastic composite or compound of glass fibers. By inserting the insulator 15, the extended end 13 of the first conductor 9, which is constructed of a spring, is pushed back so that the two oppositely-disposed switch contacts 10 and 12 are opened. The varistor fuse element is enclosed by an enclosure 16.

During normal operation, after the two feed lines 9, 11 have been connected, a current flows from the first conductor 9 through the varistor 8 to the second conductor 11, or in reverse direction. When an overvoltage occurs, the forward current rises steeply in accordance with the I/U characteristic of the varistor 8, as a consequence of which the varistor 8 heats the insulator 15 above an established relaxation temperature of the insulation material. After the relaxation temperature of the insulating material has been exceeded, the insulator 15 loses its elasticity or resiliency and the resilient conductor 9 compresses the insulator 15 with the extended end 13 thereof. As a consequence, the two switch contacts 10 and 12 close, and after the thermal fuse has tripped, a current flow occurs from the first conductor 9 through the two switch contacts 10 and 12 to the second conductor 11, or in reverse direction.

FIG. 3 illustrates a possible use of the thermal varistor fuse elements described with reference to FIGS. 1 and 2, for a high-temperature battery. The high-temperature battery has a plurality of series-connected sodium/sulfur cells 17.1, 17.2, 17.3 . . . 17.n (where n is an arbitrary whole number). The two ends of the series circuit of cells are connected to main terminals, namely a positive main terminal 18 and a negative main terminal 19. Each of the sodium/sulfur cells 17.1, . . . 17.n is bridged or bypassed by a thermal varistor fuse element 20.1 . . . 20.n.

During normal operation, each of the sodium/sulfur cells 17.1 . . . 17.n supplies a fixed voltage. The operating voltage of each cell results in a small current flow through the bridging thermal varistor fuse elements 20.1 . . . 20.n. If the internal resistance of a failing sodium/sulfur cell rises, an overvoltage results at the connecting terminals of this cell which, as described, results in an irreversible tripping of the respective varistor fuse element and subsequently in a low-resistance bridging of the high-resistance cell.

Depending on the response temperature and the response time, the thermal fuse can be formed of a conductive material, such as a metal alloy as in the embodiment according to FIG. 1, or of an insulating material, such as a glass-fiber compound as in the embodiment according to FIG. 2. By selecting suitable conductive or insulating materials, numerous possible variations with respect to desired response temperature and time are obtained.

The varistor fuse elements described above are suitable not only for voltage-dependent protection but also for temperature-dependent protection of electric circuits, that is to say the varistor fuse element also trips when the critical temperature (for example the melting point of the fusible alloy 4 or the relaxation temperature of the insulator 15) is exceeded, without an overvoltage being present on the electric circuit.

There is claimed:

1. Varistor fuse element protecting an electric circuit against overvoltages, comprising a heat-responsive insulator, a varistor combined with said insulator tripping a thermal fuse with joulean or ohmic heat losses of said varistor, first and second conductors supplying current to said fuse element, the first conductor having a U-shaped distal end having a short and a long leg, and first and second switch contacts each being attached to the respective first and second conductor, each conductor having a contact-closed and a contact-open state, said first contact being mounted on the short leg facing the second contact, bridging said varistor in their contact-closed state, at least one of said conductors having spring bias urging said conductors into their contact-closed state; said insulator serving retaining said conductors in their contact-open state against said spring bias, said insulator being in thermal communication with said varistor and in mechanical engagement with said conductors yieldingly allowing said conductors to enter irreversibly into said contact-closed state in response to said varistor being heated by a continued overvoltage being applied to said conductors, wherein said varistor is directly connected to both of said conductors, the short leg of said first conductor has an extended end, said second conductor has a tub-shaped recess formed therein opposite said extended end, said contacts are disposed opposite each other, and said insulator is formed of a material having temperature-dependent elasticity, disposed between said extended end and said recess.

2. Varistor fuse element according to claim 1, wherein said temperature-dependent material is a resilient composite material which includes glass fibers.

* * * * *